A. J. LILLY.
ELECTRIC SWITCH.
APPLICATION FILED MAY 26, 1917.
1,254,820. Patented Jan. 29, 1918.
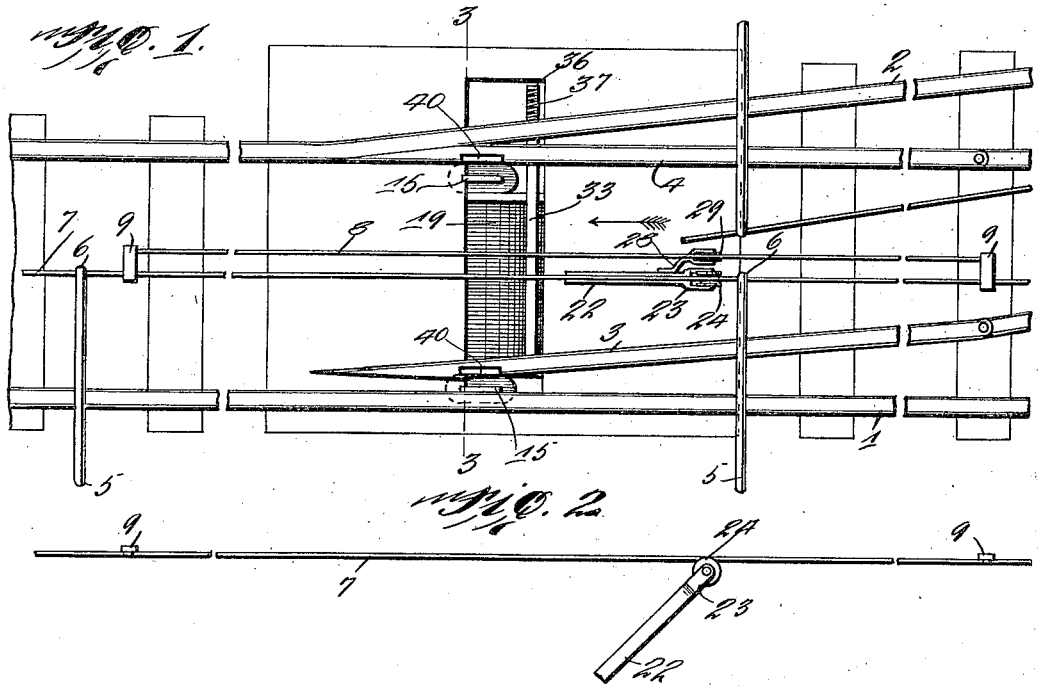
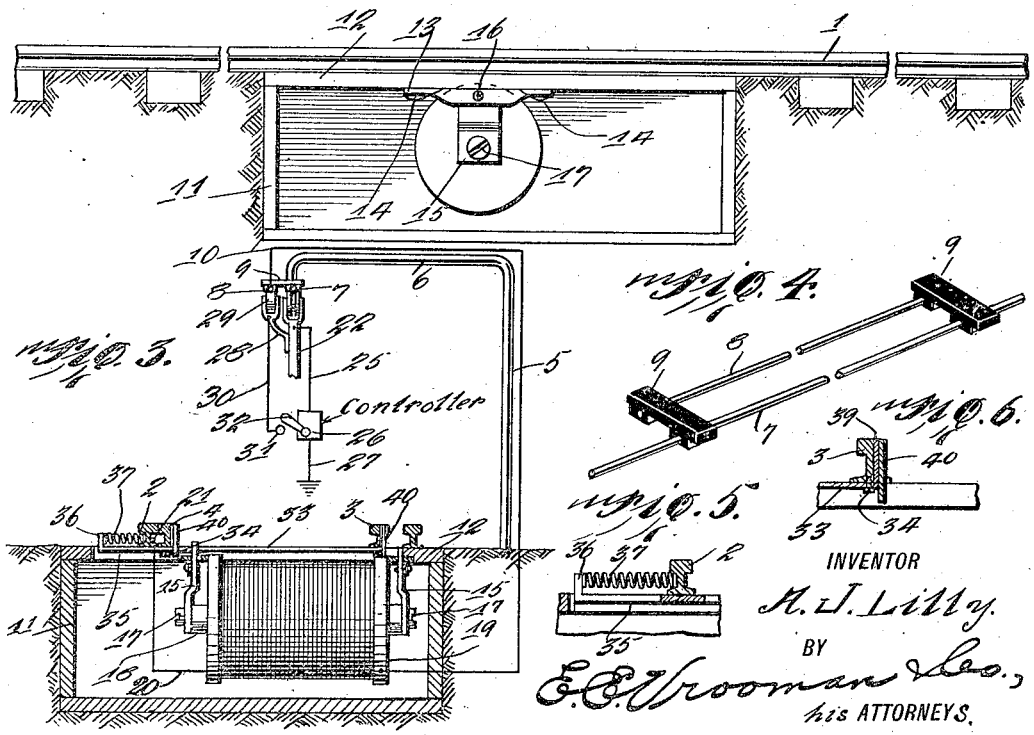
INVENTOR
A. J. Lilly
BY
E. E. Vrooman & Co.,
his ATTORNEYS.

UNITED STATES PATENT OFFICE.

ANDREW J. LILLY, OF GLEN MORGAN, WEST VIRGINIA.

ELECTRIC SWITCH.

1,254,820.  Specification of Letters Patent.  Patented Jan. 29, 1918.

Application filed May 26, 1917. Serial No. 171,157.

*To all whom it may concern:*

Be it known that I, ANDREW J. LILLY, a citizen of the United States of America, residing at Glen Morgan, in the county of Raleigh and State of West Virginia, have invented certain new and useful Improvements in Electric Switches, of which the following is a specification, reference being had therein to the accompanying drawing.

This invention relates to an electric switch and has for its principal object the production of a switch which is so constructed as to cause the switch points to be thrown in one direction by the operation of a control switch and which switch will be normally retained in one position.

Another object of this invention is the production of an electric switch wherein the switch points are thrown in one direction by the attraction of an electromagnet, although after the breaking of the circuit and the deenergization of the electromagnet the switch points will be automatically returned to their normal positions.

With these and other objects in view this invention consists in general of certain novel combinations, constructions and arrangements of parts as will be hereinafter fully described and claimed.

In the accompanying drawings:

Figure 1 is a top plan view of the electric switch.

Fig. 2 is a side elevation of the switch, a portion of the casing being removed.

Fig. 3 is a central vertical section through the device taken on the line 3—3 of Fig. 1 and illustrating the device diagrammatically.

Fig. 4 is an enlarged detail perspective view, partly broken away, of the trolley wires.

Fig. 5 is an enlarged fragmentary sectional view of a portion of the device illustrating the action of the spring used for returning the switch points to their normal positions.

Fig. 6 is a sectional view through a portion of the device, illustrating the manner in which the plate used upon each rail is supported so as to be attracted by the magnetism of the electromagnet.

Referring to the accompanying drawing by numerals, it will be seen that the electric switch is adapted to be used in connection with the stationary rails 1 and 2 and the pivotally mounted switch points 3 and 4. The trolley poles 5 are also carried adjacent the track so as to have their overhanging ends 6 carrying the trolley wire 7. The auxiliary trolley wire 8 is carried by the insulated blocks 9 mounted upon the main trolley wire 7. This trolley wire 8 is carried in spaced relation with respect to the trolley wire 7, as shown clearly in Fig. 1, and is adapted to be supplied with an electric current by means of the wire 10 connected therewith and which is adapted to be carried in any suitable manner upon one of the trolley poles 5, although as shown in Fig. 3 the wire 10 is shown in diagram.

The casing 11 is adapted to be embedded in the ground as shown in Figs. 2 and 3 and the top 12 of this casing 11 carries the strip 13 which is secured thereto by rivets or bolts 14. A strip 13 is carried adjacent each end of the casing 11 as shown in Fig. 3 and each strip is bent intermediate its ends, as shown in Fig. 3. The hanger brackets 15 are riveted to the strips 13, as shown at 16, and the upper ends of these hanger brackets 15 project for a considerable distance above the strips 13, while the hanger brackets depend for a considerable distance below the strips so as to receive the screws 17 which engage the core 18 of the electromagnet 19. Thus it will be seen that the electromagnet will be supported within the casing 11 at a point slightly below the rails 1 and 2 and the switch points 3 and 4.

The wire 10 is connected to the electromagnet 19 as shown in Fig. 3, while another wire 20 extends from the opposite end of the electromagnet 19 and is grounded upon the rail 2, as indicated at 21.

The main trolley pole 22 is provided with the usual harp 23 upon which is mounted the sheave 24 which rides upon the main trolley wire 7 for supplying the car which is adapted to be mounted upon the rails in the usual manner. This trolley pole 22 is provided with the usual feed wire 25 extending to the controller 26, and then the wire 27 extending from the controller is grounded in the usual manner upon the car. There is provided an auxiliary harp 28 having a sheave 29 mounted thereon, and this auxiliary harp 28 is suitably mounted upon and insulated from the trolley pole 22. A wire 30 leading from the auxiliary harp 28 extends to the switch point 31 so as to permit a circuit to be closed by means of the auxiliary switch 32 mounted upon the controller 26, and this auxiliary switch 32 is swung into engagement with the switch point 31. Therefore, at this time it is obvious that the closing of the circuit by the operation of the switch 32 will cause the current to pass from the auxiliary trolley wire 8 over the wire 10 to the electromagnet 19. The passing of the current through this electromagnet 19 will energize the magnet in the usual manner and will then pass over the wire 20 to the rail 2. As the car is mounted upon the rail 2 of the switch point 4, the current will then pass through the car to the wire 27 over the switch 32 and the wire 30 to the sheave 29, thus completing the auxiliary circuit which is used to energize the electromagnet 19 when it is desired to throw the switch points.

An elongated bar 33 extends transversely across the lower portions of the track and is secured by means of bolts 34 to the forward end of the switch points 3 and 4. This bar 33 is normally urged in one direction inasmuch as it has a projecting end 35 having an upturned lip 36. A coiled spring 37 bears at one end against the lip 36 and at its opposite end against the rail 2 and, as a consequence, the pressure above referred to is exerted upon the bar 33 by means of this coiled spring. Inasmuch as this bar is secured to the switch points and is rigid in one direction, it will be seen that the switch points 3 and 4 will be normally retained in the position indicated in Fig. 1.

Filler strips 39 are mounted upon the switch points 3 and 4 and upon these filler strips 39 are mounted the armatures 40 which are mounted in any suitable manner. These armatures 40 depend below the bar 33 and are carried in alinement with the upper ends of the hanger brackets 15. As a consequence, when the electromagnet 19 is energized, it will be seen that the magnetism will be present upon the hanger brackets 15 as well as upon the electromagnet 19. Since the upper ends of the hanger brackets are in alinement with the armatures 40, the armatures will be drawn or attracted into engagement with the upper projecting ends of the hanger brackets 15. This action of the armatures 40 will cause the switch points 3 and 4 to be swung to one side against the tension of the coiled spring 37. By swinging the switch points 3 and 4 to one side it will be seen that the car may pass either on to the switch or out of the switch by riding upon the switch point 3 and the rail 2.

When this electric switch is in use it normally retains the position shown in Fig. 1. Therefore, if it is desired to have a car pass in either direction in a straight line so as to ride upon the rail 1 and the switch point 4, the switch 32 should be left out of engagement with the switch point 31. Hence, the current necessary for energizing the electromagnet will not be present and the electromagnet will not be energized so as to radiate the necessary magnetism for swinging the switch points. Consequently, the car will pass over the switch points without moving the same from the position indicated in Fig. 1. If, however, a car is to pass on to the switch or out of the switch, the auxiliary switch 32 is swung into engagement with the switch point 31 so as to cause the auxiliary circuit to be formed as soon as the sheave or trolley wheel 29 engages the auxiliary trolley wire 8. Thus it will be seen that the auxiliary circuit will be formed so as to energize the electromagnet in the manner above specified and, consequently, the switch points 3 and 4 will be swung to one side, thus allowing the car to pass on to or out of the switch. As soon as the sheave 29 disengages the auxiliary trolley wire 8 or as soon as the auxiliary switch 32 is swung from engagement with the switch point 31, the auxiliary circuit used for energizing the electromagnet will be broken and, as a consequence, the electromagnet will become deënergized, thus losing the magnetic attraction for the armatures 40. At this time the tension of the spring will move the bar 33 to its normal position, thus swinging the switch points 3 and 4 to the position indicated in Fig. 1.

From the foregoing description it will be seen that a very simple and efficient electric switch has been provided wherein the switch points normally retain a set position and which are automatically swung to one side by the closing of an auxiliary circuit, although the switch points will be again returned automatically to their normal positions after the electric circuit has been broken.

What is claimed is:

1. In a device of the class described, the combination of a plurality of pivotally mounted switch points, an electromagnet carried adjacent said switch points, armatures carried by said switch points, hanger brackets connected to said electromagnet and extending into alinement with said armatures, means for forming a circuit for energizing said electromagnet whereby when the electromagnet is energized the magnetism will attract said armatures so as to swing said switch points, and means for returning said switch points to their normal position after the circuit has been broken.

2. In a device of the class described, the combination of a plurality of pivotally mounted switch points, a casing carried adjacent said switch points, supporting strips carried by said casing, hanger brackets secured to said supporting strips, an electromagnet mounted upon said hanger brackets, said hanger brackets projecting within said supporting strips, armatures mounted upon said switch points in alinement with the upper projecting ends of said hanger brackets, means for forming a circuit for energizing said electromagnet whereby the magnetism in said hanger brackets will attract said armatures for swinging said switch points.

3. In a device of the class described, the combination of a plurality of pivotally mounted switch points, a casing carried adjacent said switch points, supporting strips carried by said casing, hanger brackets secured to said supporting strips, an electromagnet mounted upon said hanger brackets, said hanger brackets projecting within said supporting strips, armatures mounted upon said switch points in alinement with the upper projecting ends of said hanger brackets, means for forming a circuit for energizing said electromagnet whereby the magnetism in said hanger brackets will attract said armatures for swinging said switch points, and means for returning said switch points to their normal position.

4. In a device of the class described, the combination of a pivotally mounted switch point, a bar secured to said switch point, said bar having an upwardly-extending end, a spring connected to said end for normally urging said bar in one direction whereby said switch point will be normally retained in a set position, an electromagnet carried adjacent said switch point, a hanger bracket connected to said electromagnet, an armature fixedly mounted upon said switch point in alinement with said hanger bracket, means for forming a circuit for energizing said electromagnet whereby the magnetism exerted upon the armature will attract the armature for swinging said switch point and upon the absence of the magnetism in the magnet the tension of the spring will return said switch point to its normal position.

In testimony whereof I hereunto affix my signature.

ANDREW J. LILLY.

Copies of this patent may be obtained for five cents each, by addressing the "Commissioner of Patents, Washington, D. C."